Oct. 12, 1948.    G. WHITEHURST ET AL    2,451,138
TRUCK LOADER

Filed Oct. 7, 1946    2 Sheets-Sheet 2

Inventors
Graham Whitehurst
Vernon E. Slater
Gustave P. Krawitz
Joseph M. Hubbard
George F. Bruno By Lyon & Lyon attorneys Patented Oct. 12, 1948

2,451,138

UNITED STATES PATENT OFFICE 2,451,138

TRUCK LOADER

Graham Whitehurst, Glendale, Vernon E. Slater, Los Angeles, George F. Bruno, Montebello, and Joseph M. Hubbard and Gustave P. Krawitz, Los Angeles, Calif.

Application October 7, 1946, Serial No. 701,742

3 Claims. (Cl. 214—85)

Our invention relates to truck loaders and more specifically to a device which can be lowered into contact with the ground, material loaded thereon and the device then raised into a parallel position in relation to the bed of the truck.

An object of our invention is to provide a truck loading mechanism which has a loading platform which is at all times substantially parallel to the ground both in its lowered position and in its raised position.

Another object of our invention is to provide a truck loader which will form an extension parallel to and at the same height as the floor of the truck and thus act as an extension of that floor.

Another object of our invention is to provide a truck loader which has a loading platform which will come in contact with the ground and onto which merchandise can be moved without lifting.

Another object of our invention is to provide a loading mechanism that will support itself by contact with the ground and which can be elevated to permit operation of the truck.

Another object of our invention is to provide a truck loading mechanism which can be adapted to any truck body.

Other objects and advantages of our invention will be apparent from the following description of the preferred embodiments thereof.

In the drawings:

Figure 4 is a cross section taken on the line 4—4 of Figure 2.

Figure 5 is a cross section taken on the line 5—5 of Figure 2.

Figure 6 is a cross section taken on the line 6—6 of Figure 2.

Figure 7 is a cross section taken on the line 7—7 of Figure 2.

Figure 8 is a cross section taken on the line 8—8 of Figure 2.

Figure 1:
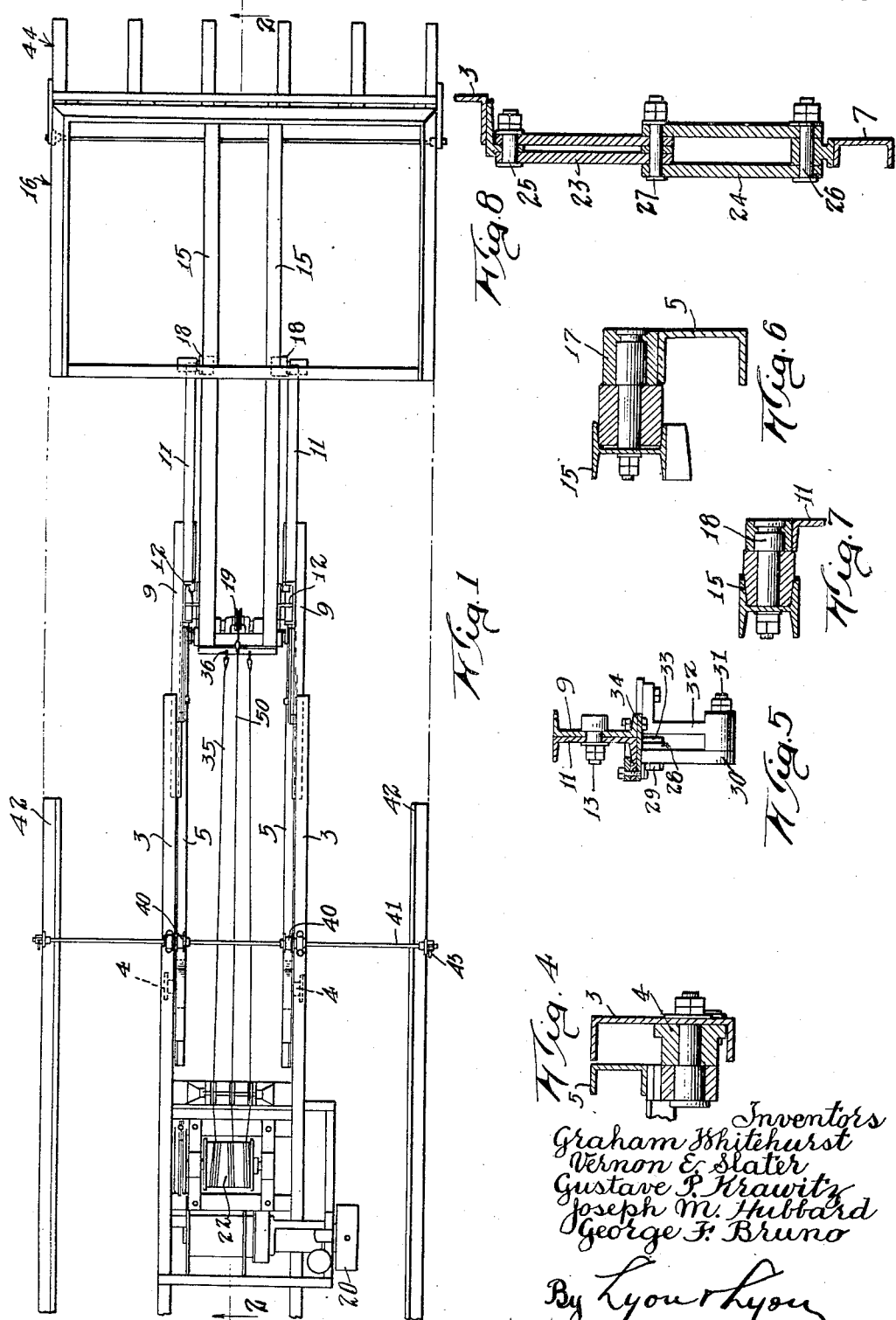
Figure 1 is a top plan view with the truck bed and loader bed removed.
Figure 2:
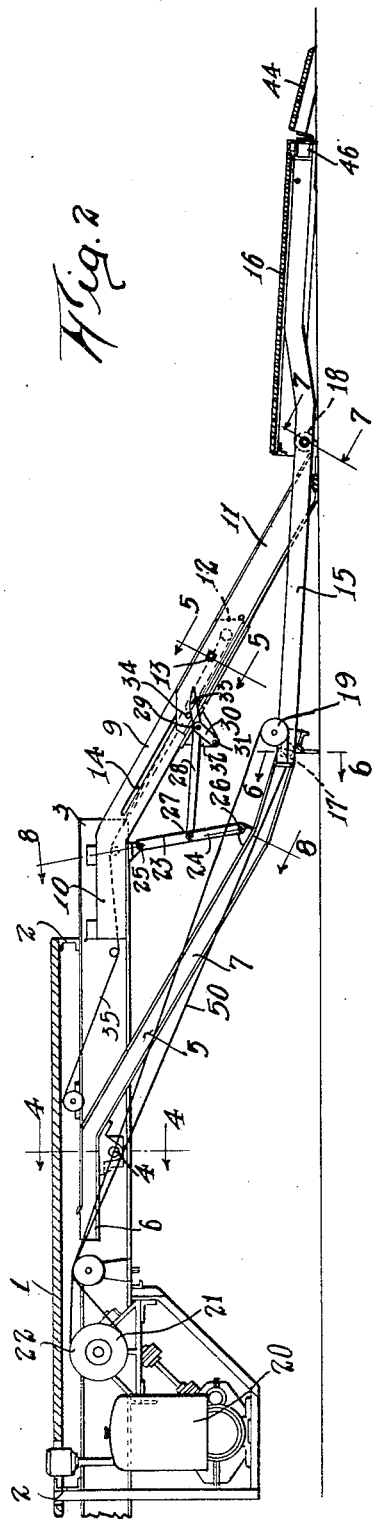
Figure 2 is a cross section taken on the line 2—2 of Figure 1 showing the truck mechanism in its loading position.
Figure 3:
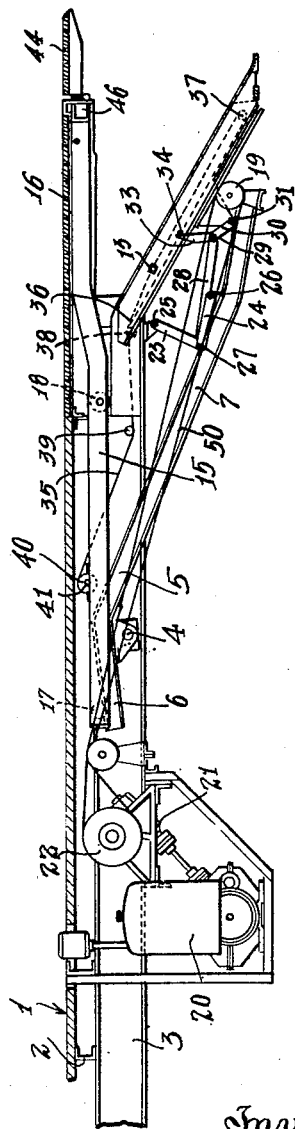
Figure 3 is a cross section taken on the line 2—2 of Figure 1 with the truck loading mechanism in its traveling position.

A truck loader constructed in accordance with the preferred form of our invention is attached to the bed 1 of a truck by means of channel supports 2, which support a pair of spaced channel members 3 horizontally under the truck bed 1.

Spaced guides 5 formed from the channel members are pivotally suspended by the pinions 4 to the channels 3. The guides 5 in their extended position have an extension 6 which in its normal position is parallel with the channel members 3. From the extensions 6 the guides 5 run in an angular slope towards the ground, as shown at 7.

Attached to the ends of the channel members 3 are spaced guides 9 which have extensions 10 parallel to the channel members 3 and the remainder of the guides 9 slope toward the ground substantially parallel to the main portion of the guides 5. The guides 5 and 9 are substantially parallel throughout their lengths.

Attached to the lower ends of the guides 9 are telescopic extensions 11. Plates 12 bolted to the guides 9 form a rest upon which the extensions 11 slide and bolts 13 passing through holes in the extensions 11 and sliding in the slots 14 permit the extensions 11 to be moved in relation to the guides 9 so that they may be telescopically shortened. This permits the guides 9, when elongated by the extensions 11, to strike the ground during the loading operation and to reduce the tendency of our loader to tip the truck. The extensions 11 and the guides 9 comprise one sloping surface.

Supporting members 15 carry at their outer ends a loading platform 16. These supports 15 have guide rollers 17 journaled at one end which are adapted to roll on the guides 5. Journaled on the support 15 adjacent the inner end of the loading platform 16 are guide rollers 18 which are adapted to roll on the upper surfaces of the guides 9 and extensions 11.

Attached to the support 15 is a pulley 19 connected by a cable 50 to a hoisting drum 22, which is actuated by a prime mover 20 through a reduction gear 21. Actuation of the hoisting drum 22 draws in the cable 50 pulling the supports 15 on the guide rollers 17 and 18 up over the guides 5 and 9. As these guides are substantially parallel the loading platform 16 will be held in a substantially horizontal position to the ground as the rollers 17 and 18 roll up the spaced guides 5 and 9.

The guides 5 are maintained in substantially parallel spaced relation to the channels 9 by links 23 and 24 pivotally connected together at 27 and pivoted to the channels 3 at 25 and to the guides 5 at 26. Attached to the pivots 27 are link members 28 which are pivotally connected at 29 to links 30 pivoted at 31 to brackets 32 attached to the guides 9. Also attached to the pivots 29 are trigger members 33 which are struck by pins 34 on the extensions 11. The extensions 11, to aid in supporting the load on the loading platform 16, contact the ground, and to retract the extensions 11 cables 35 are attached to the extensions 11 at 36 and run over guide pulleys 37, 38 and 39 to drums 40 affixed to a shaft 41 extending between the frames 42 of the truck proper. On the ends of the shaft 41 there are keyed means 43 upon which a crank can be attached to rotate the drums 40 and telescope the extensions 11 upwardly on the guides 9. When the extensions 11 are thus raised the pins 34 strike the trigger members 33, causing them to force the links 28 to bend the straight arms formed by the links 23 and 24, thus lifting the guides 5 as they are attached by the pinions 4. This permits the guides 5 to be made longer and to nearly strike the ground. By being pivoted at 4 when the loader is in its uppermost position, the guides 5 are pivoted upwardly and the clearance between their lower ends increased to permit use of the truck. The guide rollers 17 and 18 are retracted clear up to the ends of the guides 5 and 9 and as they pass on to the extensions 10 and 6 they level the loading platform 16 into an exactly horizontal position with relation to the truck body 1.

When the supports 15 are at their lowest position the loading platform 16 is in contact with the ground and substantially parallel therewith. However the platform 16 and supports 15 do have a thickness and we therefore attach a hinged end-gate 44 to the cross channels 46 to permit easy loading.

Having fully described our invention, it is to be understood that we do not wish to be limited to the details herein set forth, but our invention is of the full scope of the appended claims.

We claim:

1. In a truck loader, channel members adapted to be attached to a truck bed, a pair of spaced guides attached to said members, and sloping at an angle thereto, a second pair of spaced guides attached to said members and parallel to the first pair, a loading platform, means attached to said platform, and mobile on said guides to permit said platform to be raised or lowered in a horizontal position, said second pair of guides having telescopic ends thereon to permit contact with the ground when in loading position and retractable when said truck is traveling, said first pair of guides pivotally attached to said channel members, and link means carried by said second pair of guides to support said first mentioned guides and to lift said first guides when said platform is raised.

2. In a truck loader, channel members adapted to be attached to a truck bed, a pair of spaced guides attached to said members, and sloping at an angle thereto, a second pair of spaced guides attached to said members and parallel to the first pair, a loading platform, rollers connected with said loading platform adapted to roll upon one pair of said guides, and supporting members attached to said platform carrying rollers to roll upon the second pair of said guides to permit said platform to be raised or lowered in a horizontal position, said second pair of guides having telescopic ends thereon to permit contact with the ground when in loading position and retractable when said truck is traveling, said first pair of guides pivotally attached to said channel members, and link means carried by said second pair of guides to support said first mentioned guides and to lift said first guides when said platform is raised.

3. In a truck loader, channel members adapted to be attached to a truck bed, a pair of spaced guides attached to said members, and sloping at an angle thereto, a second pair of spaced guides attached to said members and parallel to the first pair, a loading platform, means attached to said platform, and mobile on said guides to permit said platform to be raised or lowered in a horizontal position, said second pair of guides having telescopic ends thereon to permit contact with the ground when in loading position and retractable when said truck is traveling, said first pair of guides pivotally attached to said channel members, and link means carried by said second pair of guides to support said first mentioned guides and to lift said first guides when said platform is raised, said guides having their upper ends substantially horizontal whereby when said platform is raised to its uppermost position the load of said platform rests upon the horizontal portions of said guides.

GRAHAM WHITEHURST.
VERNON E. SLATER.
GEORGE F. BRUNO.
JOSEPH M. HUBBARD.
GUSTAVE P. KRAWITZ.

REFERENCES CITED

The following references are of record in the file of this patent:

UNITED STATES PATENTS

| Number | Name | Date |
|---|---|---|
| 81,677 | Pearce | Sept. 1, 1868 |
| 460,196 | Chase | Sept. 29, 1891 |
| 1,391,607 | Bourgeois | Sept. 20, 1921 |
| 1,427,189 | Bourgeois | Aug. 29, 1922 |

FOREIGN PATENTS

| Number | Country | Date |
|---|---|---|
| 16,591 | Australia | 1928 |